US009794754B2

(12) United States Patent
Christie et al.

(10) Patent No.: US 9,794,754 B2
(45) Date of Patent: *Oct. 17, 2017

(54) RUNNING LOCATION PROVIDER PROCESSES

(71) Applicant: Google Inc., Mountain View, CA (US)

(72) Inventors: David Nicholas Christie, San Francisco, CA (US); Vidya Narayanan, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/230,815

(22) Filed: Aug. 8, 2016

(65) Prior Publication Data

US 2016/0345136 A1 Nov. 24, 2016

Related U.S. Application Data

(63) Continuation of application No. 14/530,997, filed on Nov. 3, 2014, now Pat. No. 9,439,043.

(Continued)

(51) Int. Cl.
*H04W 4/02* (2009.01)
*H04W 52/02* (2009.01)
(Continued)

(52) U.S. Cl.
CPC .............. *H04W 4/028* (2013.01); *G01S 19/34* (2013.01); *G01S 19/48* (2013.01); *G01S 19/49* (2013.01);
(Continued)

(58) Field of Classification Search
CPC .... H04W 4/028; H04W 4/027; H04W 64/006
(Continued)

(56) References Cited

U.S. PATENT DOCUMENTS 6,975,959 B2    12/2005  Dietrich et al.
9,646,500 B2 *   5/2017  Lubeck ................. G08G 1/202
(Continued)

FOREIGN PATENT DOCUMENTS

JP    2007-172322 A    7/2007
JP    2011-209846 A   10/2011
(Continued)

OTHER PUBLICATIONS

International Search Report for corresponding international application No. PCT/US15/26730 mailed Jul. 30, 2015.
(Continued)

*Primary Examiner* — Cong Tran
(74) *Attorney, Agent, or Firm* — McDonnell Boehnen Hulbert

(57) ABSTRACT

Examples describe methods, computing devices, and systems for using location provider (LP) processes to accurately identify a proximate location of a computing device, while reducing the power consumption of the computing device. An example method may include executing, on a computing device, both a first LP process and a second LP process simultaneously for at least part of a time period to determine outputs indicative of locations of the computing device for the time period. Further, the method may include determining a motion model of the computing device that indicates expected locations of the computing device. Yet further, the method may include making a comparison of the outputs to the motion model for the time period. In addition, the method may include disabling one of the LP processes based on the comparison.

20 Claims, 9 Drawing Sheets

Related U.S. Application Data

(60) Provisional application No. 61/994,546, filed on May 16, 2014.

(51) Int. Cl.
*H04W 64/00* (2009.01)
*G01S 19/34* (2010.01)
*G01S 19/48* (2010.01)
*G01S 19/49* (2010.01)

(52) U.S. Cl.
CPC ....... *H04W 4/027* (2013.01); *H04W 52/0261* (2013.01); *H04W 52/0277* (2013.01); *H04W 64/00* (2013.01); *H04W 64/006* (2013.01); H04W 52/0264 (2013.01); Y02B 60/50 (2013.01)

(58) Field of Classification Search
USPC ..... 455/404.1–2, 456.1, 457, 6; 705/5, 6, 13
See application file for complete search history.

(56) References Cited

U.S. PATENT DOCUMENTS

| | | | | |
|---|---|---|---|---|
| 2003/0087648 | A1* | 5/2003 | Mezhvinsky | G06F 17/3087 455/456.1 |
| 2009/0030885 | A1* | 1/2009 | DePasquale | G06Q 10/02 |
| 2009/0112517 | A1 | 4/2009 | Hsyu et al. | |
| 2010/0058086 | A1 | 3/2010 | Lee | |
| 2012/0066535 | A1 | 3/2012 | Naffziger | |
| 2013/0339478 | A1 | 12/2013 | Edge et al. | |
| 2014/0094198 | A1 | 4/2014 | Heo et al. | |
| 2015/0011196 | A1 | 1/2015 | Jayakumar et al. | |
| 2015/0080020 | A1 | 3/2015 | Edge | |
| 2015/0223015 | A1 | 8/2015 | Steiner | |

FOREIGN PATENT DOCUMENTS

| | | |
|---|---|---|
| KR | 10-2014-0057083 A1 | 5/2014 |
| WO | 2014/069950 A1 | 5/2014 |

OTHER PUBLICATIONS

Written Opinion for corresponding international application No. PCT/US15/26730 mailed Jul. 30, 2015.
Recognizing the User's Current Activity, Android, available at http://developer.android.com/training/location/activity-recognition.html, accessed on Oct. 31, 2014.
Office Action with translation for related Korean Patent Application No. 10-2016-7031998 transmitted Jul. 16, 2017.

* cited by examiner

| ACTIVITY 502 | SENSOR 504 | SENSOR 506 | DEAD RECKONING 508 | LOCATION 510 |
|---|---|---|---|---|
| ACTIVITY 518 | MOTION 520 | 522 | 524 | LOCATION 526 |
| ACTIVITY 528 | 530 | TEMPERATURE 532 | 534 | LOCATION 536 |
| ACTIVITY 538 | MOTION 540 | 542 | DIRECTION 544 | LOCATION 546 |

FIG. 5

| LP DATA 802 | LP DATA 804 | MOTION MODEL DATA 806 | THRESHOLD DATA 808 |
|---|---|---|---|
| LOCATION 816 | 818 | LOCATION 820 | DISTANCE 822 |
| LOCATION 824 | LOCATION 826 | LOCATION 828 | DISTANCE 830 |
| 830 | LOCATION 832 | LOCATION 834 | DISTANCE 836 |

RUNNING LOCATION PROVIDER PROCESSES

CROSS-REFERENCE TO RELATED APPLICATIONS

This application is a continuation of U.S. patent application Ser. No. 14/530,997 filed on Nov. 3, 2014, the contents of which are hereby incorporated by reference.

This application claims the benefit of U.S. Provisional Patent Application No. 61/994,546 filed on May 16, 2014, the contents of which are hereby incorporated by reference.

BACKGROUND

Unless otherwise indicated herein, the materials described in this section are not prior art to the claims in this application and are not admitted to be prior art by inclusion in this section.

A proximate location of a computing device may be determined by using many different processes. Further, various types of data may be obtained to determine the proximate location of the computing device such as Global Positioning System (GPS) data and/or data associated with a wireless access point, such as a cellular base station or an 802.11 access point. For example, a computing device may receive a GPS signal and responsively determine its position on the face of the Earth (e.g. an absolute location). In another example, the computing device may receive a signal from a cellular base station and/or an 802.11 access point. Based on the signal received, the computing device may calculate a proximate location of the computing device.

In some instances, the proximate location of the computing device may be determined from multiple different networks. Many location-based services may be implemented to determine the proximate location of the mobile computing device.

SUMMARY

Embodiments herein provide example methods, computing devices, and systems for executing one or more location provider (LP) processes to determine an estimated location of a computing device. Each LP process may execute on the computing device for at least part of a given period of time using a respective processor. For example, a first location provider (LP) process may execute on application first processor and a second LP process may execute on a second processor. By measuring the power consumed by each LP process, one of the LP processes may be used for succeeding time periods, possibly to save power in the computing device.

In one example, a method is provided. The method includes executing, on a computing device, a first location provider (LP) process and a second LP process for at least part of a first time period, where executing the first LP process includes using application first processor, and where executing the second LP process includes using a second processor. Further, the method includes obtaining a first estimated location of the computing device from the first LP process. Yet further, the method includes obtaining a second estimated location of the computing device from the second LP process. In addition, the method includes determining a first power consumption from the first LP process. Further, the method includes determining a second power consumption from the second LP process. Based on at least the first power consumption and the second power consumption, the method includes determining one of the first LP process and the second LP process to execute for at least part of a second time period.

In another example, a system is provided. The system includes one or more processors, where the one or more processors include a first processor and a second processor. Further, the system includes data storage that includes instructions executable by the one or more processors to perform operations. The operations includes executing a first location provider (LP) process and a second LP process for at least part of a first time period, where executing the first LP process includes using the first processor, and where executing the second LP process includes using the second processor. Further, the operations include obtaining a first estimated location of the system from the first LP process. Yet further, the operations include obtaining a second estimated location of the system from the second LP process. In addition, the operations include determining a first power consumption from the first LP process. Further, the operations include determining a second power consumption from the second LP process. Based on at least the first power consumption and the second power consumption, the operations include determining one of the first LP process and the second LP process to execute for at least part of a second time period.

In still another example, a method is provided. The method includes executing, on a computing device, one of a first location provider (LP) process and a second LP process to obtain first estimated locations of the computing device, where executing the first LP process includes using a first processor, and where executing the second LP process includes using a second processor. Further, the method includes determining a motion model of the computing device that provides expected locations of the computing device. Yet further, the method includes making a comparison of the first estimated locations with the expected locations from the motion model. Based on at least the comparison, the method includes enabling both the first LP process and the second LP process to execute on the computing device simultaneously for at least part of a time period to reevaluate which of the first LP process and the second LP process indicates second estimated locations closer to the expected locations.

In still another example, a system is provided. The system includes means for executing, on a computing device, a first location provider (LP) process and a second LP process for at least part of a first time period, where executing the first LP process includes using application first processor, and where executing the second LP process includes using a second processor. Further, the system includes means for obtaining a first estimated location of the computing device from the first LP process. Yet further, the system includes means for obtaining a second estimated location of the computing device from the second LP process. In addition, the system includes means for determining a first power consumption from the first LP process. Further, the system includes means for determining a second power consumption from the second LP process. Based on at least the first power consumption and the second power consumption, the system includes means for selecting one of the first LP process and the second LP process to execute for at least part of a second time period.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 5 illustrates a motion model, according to an example implementation.

DETAILED DESCRIPTION

Figure 1:
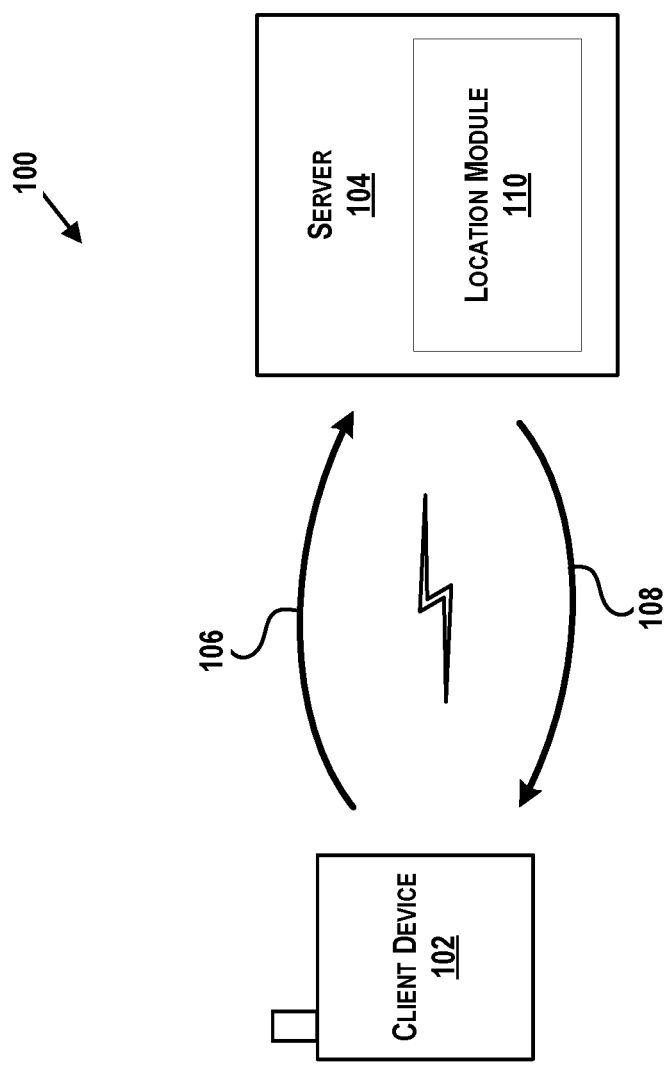
FIG. 1 illustrates a system, according to an example implementation.

The following detailed description describes various features or operations of the disclosed systems and methods with reference to the accompanying figures. In the figures, similar symbols identify similar components, unless context dictates otherwise. The illustrative method, devices, and/or system embodiments described herein are not meant to be limiting. It may be readily understood that certain aspects of the disclosed methods, devices, and/or systems can be arranged and combined in a wide variety of different configurations, all of which are contemplated herein I. Overview Various processes may run on a computing device to determine an estimated location of the computing device. For example, consider a scenario in which a smartphone displays a map showing a blue dot representing the proximate location of the smartphone. In some instances, the smartphone may obtain one or more signals to show the blue dot on the map. For example, the smartphone may obtain signals such as a Global Positioning System (GPS) signal, a Wi-Fi signal, and/or a sensor signal. In some instances, such signals may be combined or fused by running one or more location provider (LP) processes on the smartphone. As such, the placement of the blue dot may be a result of running the one or more LP processes.

Yet, with less than ideal conditions for using an LP process and/or less than ideal LP processes alone, the accuracy of the blue dot in the map may vary. In particular, varying accuracies may cause jumpiness between estimated locations of the blue dot in the map. As such, the blue dot may jump around on the map, making it difficult to ascertain the proximate location of the computing device. In such instances, multiple LP processes may be run on the smartphone to assess the accuracy of each LP process that estimates the proximate locations of the smartphone.

In some embodiments, running multiple LP processes may be challenging. For example, one of the LP process may involve waking up or running an application processor. In some instances, running the application processor may draw more power than running other processors in the smartphone. For example, running the application processor may consume more battery power due to heavy processing that may be involved with running the application processor. As such, running an LP process on the application processor to identify the proximate location of the smartphone may cause the smartphone to lose power at an accelerated rate.

Therefore, embodiments herein provide example methods, computing devices, and systems for executing multiple LP processes to accurately identify a proximate location of a computing device, while reducing the power consumption of the computing device. For example, considering the scenario above, a first LP process may run on a first processor of the smartphone to illustrate the blue dot on the map. Further, a second LP process may run on a second processor of the smartphone to estimate locations proximate to the location of the blue dot. Thus, the smartphone may disable the first LP process and continue with the second LP process to reduce the power consumption involved with running the first processor, among other possibilities.

II. Introduction

FIG. 1 illustrates a system, according to an example implementation. The example communication system 100 may carry out one or more of the methods described herein. In some instances, communication system 100 may include computing devices for carrying out one or more of the methods described herein. It should be noted that a "computing device" may be referred to interchangeably herein with a "client device" such as, for example, client device 102 in communication system 100 with a server 104.

The client device 102 may be any type of client device and/or a transmitting device such as a laptop computer, a wearable computing device, a head-mountable computing device, a mobile telephone, and/or a tablet computing device, among other computing devices. The client device 102 may be configured to transmit data 106 to and/or receive data 108 from the server 104 in accordance with the method and operations described herein. For example, in FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may include a user interface, a communication interface, a processor, and data storage including non-transitory computer-readable mediums. The data storage may also include instructions executable by the processor for carrying out one or more operations relating to the data sent to, or received by, the server 104. The user interface of the client device 102 may include buttons, a touchscreen, a microphone, and/or any other elements for receiving inputs, as well as a speaker, one or more displays, and/or any other elements for communicating outputs.

The server 104 may be any entity or computing device arranged to carry out the methods and operations described herein. Further, the server 104 may be configured to send data 108 to and/or receive data 106 from the client device 102. The server 104 may include a location module 110 which may be configured to process the data 106 received from the client device 102 to determine one or more estimated locations (e.g., present and historical proximate locations) associated with the client device 102.

The data 106 received by the server 104 from the client device 102 may take various forms. For example, the client device 102 may provide data or information indicative of one or more proximate locations of the client device 102, one or more movements of the client device 102, and/or inputs from a user of the client device 102. The server 104 may then process the data 106 to identify a location history that matches the received data.

The data 108 sent to the client device 102 from the server 104 may take various forms. For example, the server 104 may send to the client device 102 an indication of the one or more proximate locations, updated location history information, and/or other information based on the one or more proximate locations of the device. For example, the server 104 may send to the client device 102 data or information regarding the areas surrounding the proximate location of the client device 102.

Figure 2:
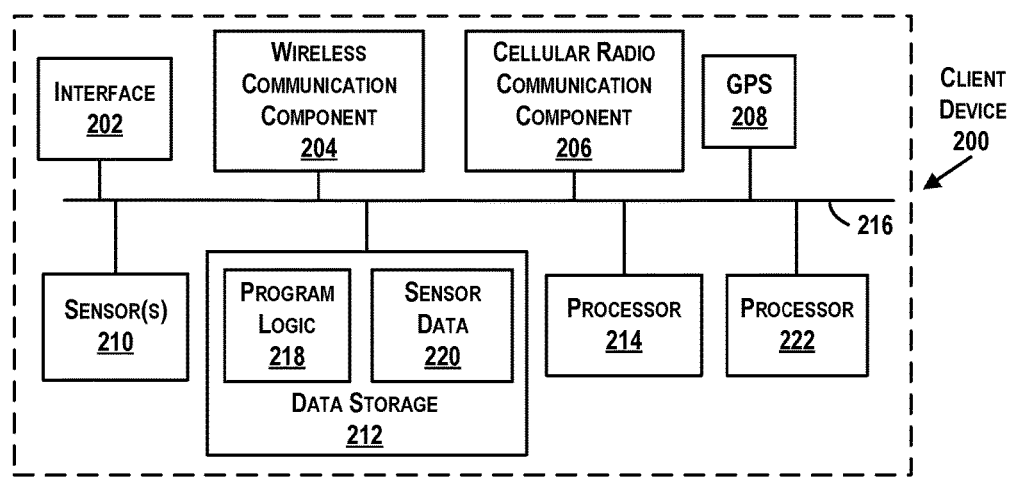
FIG. 2 illustrates a computing device, according to an example implementation.

FIG. 2 illustrates a schematic drawing of an example device 200. In FIG. 2, client device 200 may take, for example, the form of any client device described above in relation to FIG. 1. In some examples, some components illustrated in FIG. 2 may be distributed across multiple computing devices. In addition, for illustrative purposes, components are shown and described in FIG. 2 as part of one example client device 200. The client device 200 may take, for example, the form of any device described above in relation to FIG. 1 or a similar device that may be configured to perform the operations described herein.

In some implementations, the client device 200 may include a device platform or operating system, which may be configured as a multi-layered Linux platform and/or a functionally equivalent operating system. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include additional hardware to enable communication within the client device 200 and between the client device 200 and another computing device such as the server 104 in FIG. 1. Additional hardware of the client device 200 may include transmitters, receivers, and antennas, for example.

The interface 202 may be configured to allow the client device 200 to communicate with another computing device, such as the server 104 in FIG. 1. Thus, the interface 202 may be configured to receive input data from one or more other computing devices, and may also be configured to send output data to the one or more other computing devices. In some examples, the interface 202 may also maintain and manage data or data records received and/or sent by the client device 200. In other examples, such data or data records may be maintained and managed by other components of the client device 200. The interface 202 may also include a receiver and transmitter to receive and send data, respectively. In other examples, the interface 202 may also include a user-interface, such as a keyboard, a microphone, and a touchscreen, among other interfaces, to receive inputs as well.

The wireless communication component 204 may be a communication interface configured to send and receive wireless data for the client device 200, according to one or more wireless communication standards. For example, the wireless communication component 204 may include a Wi-Fi communication component that is configured to send and receive wireless data according to one or more IEEE 802.11 standards. As another example, the wireless communication component 204 may include a Bluetooth communication component configured to send and receive wireless data according to one or more Bluetooth standards, among other possible standards.

The data storage 212 may store program logic 218 that can be accessed and executed by the processor 214 and/or processor 222. The data storage 210 may also store collected sensor data 220 that may include data collected by any of the wireless communication component 204, the cellular radio communication component 206, the GPS 208, and any of sensors 210.

The communication link 216 may be illustrated as a wired connection, yet, wireless connections may also be implemented as well. For example, the communication link 216 may be a wired serial bus such as a universal serial bus, a parallel bus, and/or a wireless connection using short-range wireless radio technology. Further, additional wireless connections may be used such communication protocols described in IEEE 802.11 (including any IEEE 802.11 revisions), or Cellular technology, among other possibilities.

The processor 214 and the processor 222 may be the same or different types of processors. In one example, the processor 214 may be an application processor and the processor 222 may be a second processor of client device 200. The processor 214 may be configured to send data to and receive data from various components of the client device 200. In some implementations, the processor 222 may be a general processing unit (GPU), or possibly a baseband processor, also configured to send data to and receive data from various components of the client device 200. In some implementations, the processor 222 may also be an application processor, possibly similar to or different than the processor 214.

In some instances, processors 214 and 222 may run or execute one or more location provider (LP) processes to determine one or more estimated locations of the client device 200, including the proximate locations of the client device 200. Processors 214 and 222 may run hardware processes involving the components of the client device 200 and/or software processes involving fused location providers (FLP), hardware abstraction layers (HAL), and location batching, among other possibilities. Thus, processors 214 and 222 may communicate with one or more of the interface 202, the wireless communication component 204, the cellular radio communication component 206, the GPS 208, the sensors 210, the data storage 212, and the processor 222 to determine estimated locations of the client device.

In some embodiments, processor 214 may run a LP process that utilizes a location-determination algorithm to determine an estimated location of client device 200. For example, an estimated location of client device 200 may be determined based on nearby cellular base stations. In particular, the cellular radio communication component 206 may be configured to at least identify a cell from which the client device 200 is receiving one or more signals from a cellular network. Further, the cellular radio communication component 206 may also be configured to measure a round trip time (RTT) to a base station providing the signals. Processor 214 may combine this information with the identified cell to estimate a proximate location of the client device 200. In another example, the cellular communication component 206 may be configured to use observed time difference of arrival (OTDOA) from three or more base stations such that processor 214 may compute estimated locations of the client device 200.

In some implementations, processor 214 may run an LP process based on a presence and/or a proximate location of one or more known wireless access points. For example, the one or more access points may be in a wireless range of the client device 200. Further, the wireless communication component 204 may determine the identity of one or more wireless access points (e.g., a MAC address) and measure an intensity of signals received (e.g., received signal strength indication) from each of the one or more wireless access points. Thus, the received signal strength indication (RSSI) from a wireless access point may be used such that the processor 214 may compute a respective distance from each wireless access point. As such, the distances may be compared to a database that stores information regarding where wireless access points are located. Based on the distance from each wireless access point and the known location of each of the wireless access point, the processor 214 may estimate locations of the client device 200 may be determined.

In some embodiments, running a first LP process and a second LP process may involve using the processors 214 and 222. For example, processor 214 may run a first LP process involving a location-determination algorithm that combines location estimates determined by multiple location-determination components. In particular, such components may include the interface 202, the wireless communication component 204, the cellular radio component 206, the GPS 208, the data storage 212, and the sensors 210. Further, the sensors 210 may include accelerometers, gyroscopes, magnetometers, and Bluetooth Low Energy, among other possibilities. Yet further, the processor 222 may run a second LP process utilizing a Wi-Fi database and cache data in hardware layers of the client device 200. The processor 222 may determine estimated locations of the client device 200, possibly saving power in the computing device 200. As such, the second LP process may determine the estimated locations possibly while the client device 200 is in a low power mode.

In some embodiments, processors 214 and 222 may run LP processes involving receiving sensor data or sensor outputs. For example, LP processes may involve receiving data from sensor(s) 210 and/or GPS 208. In some instances, LP processes may receive the data to determine proximate locations of the computing device 200. In some instances, LP processes may involve a hardware process such as a hardware abstraction layer (HAL) interfacing the operating system of the client device 200. For example, HAL may provide an interface between the sensors 210 and GPS 208, and the operating system. In particular, HAL may provide the interface that sensors 210 and GPS 208 call into, allowing the sensors 210 and GPS 208 to function correctly and provide data indicating estimated locations of the computing device 200. The sensors 210 may include one or multiple sensors. For example, sensors 210 may include an accelerometer, gyroscope, magnetometer, pedometer, light sensors, microphone, camera, or other location and/or context-aware sensors.

In some embodiments, running an LP process may involve accessing low-level data, such as GPS pseudo ranges obtained from GPS 208. For example, the processor 214 and/or 222 may run a location-determination algorithm to determine the estimated locations of the client device 200 based on GPS signals sent by GPS satellites above the Earth. For example, the GPS system 208 may be configured to estimate a proximate location of computing device 200 by timing signals sent by the GPS satellites.

In some embodiments, running an LP process may involve a fused location provider (FLP). For example, the FLP may fuse or combine location-determining algorithms, methods, and/or code to determine the estimated locations of the client device 200. For example, processors 214 may run an LP process involving a FLP such that it consumes more power than processor 222.

In some embodiments, running an LP process may involve location batching. In some instances, location batching may involve grouping or stacking estimated locations. For example, location batching may involve using particular instructions for grouping locations during intervals, "LocationRequest.setDeliveryInterval(long deliveryIntervalMs)". In some instances, time periods or waiting periods may be determined for sending estimated locations to the client device 200.

In some instances, running an LP process may involve a callback mechanism. For example, the LP process may involve multiple calls to batch locations. In particular, an application programming interface (API) may be implemented with a "listener" callback:

```
public interface LocationBatchListener {
    void onLocationChanged(List<Location> locations);
}
```

In some instances, the estimated locations may be sorted or ordered. For example, the listener callback may be implemented to sort estimated locations from newest to oldest, among other possibilities. In some instances, LP processes may involve using one or more applications to perform operations. For example, an application may be granted rights or privileges to perform operations. For such rights or privileges, e.g., PendingtonIntent rights, the applications may retrieve estimated locations ordered from newest to oldest:

```
ArrayList<Location> locations = intent.getParcelableArrayListExtra(
FusedLocationProvider.KEY_LOCATION_LIST_CHANGED);
```

In some implementations, running the LP process may involve HAL batching, possibly in addition to the listener callback. Yet, if HAL batching is unavailable, the LP process may involve Wi-Fi batching with the listener callback to sort the estimated locations from newest to oldest, among other possibilities.

Example methods described herein may be performed by one or more components of the client device 200, or in combination by one or all of the components of the client device 200. In one instance, portions of the client device 200 may process data and provide an output internally in the client device 200 to the processors 214 and 222, for example. In other instances, portions of the client device 200 may process data and provide outputs externally to other computing devices.

Figure 3:
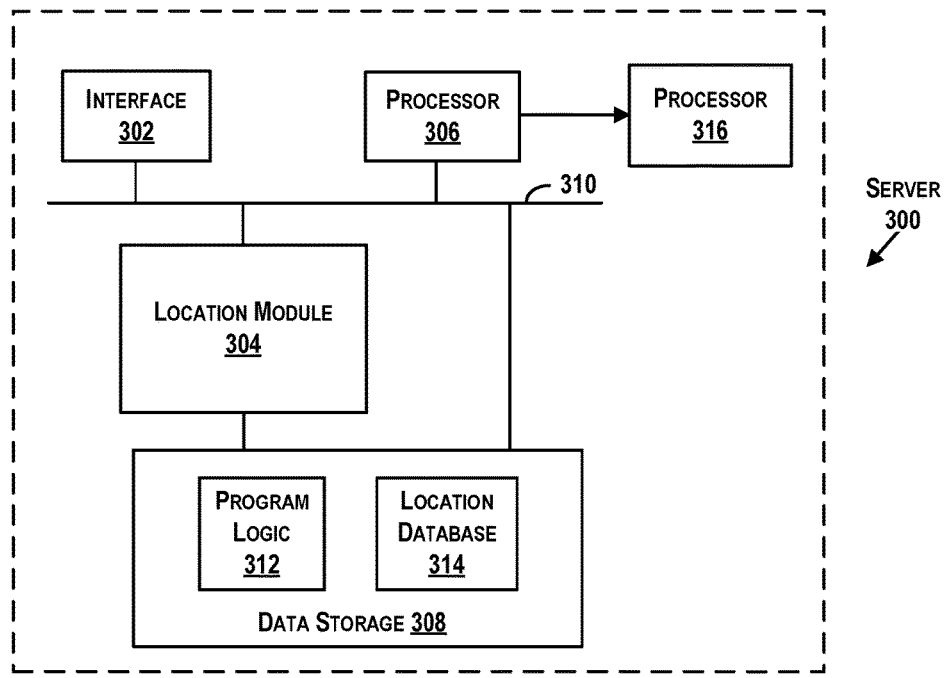
FIG. 3 illustrates another computing device, according to an example implementation.

FIG. 3 illustrates another computing device, according to an example implementation. In FIG. 3, server 300 may, for example, take the form of any computing device described above in relation to FIGS. 1 and 2. In some examples, some components illustrated in FIG. 3 may be distributed across multiple servers. For the sake of example, the components are shown and described as part of one example server 300. The server 300 may be a computing device, a device in a cloud, and/or a similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device. The hardware may include transmitters, receivers, and antennas, for example.

The communication interface 302 may allow the server 300 to communicate with another device, such as a computing device described above in relation to FIGS. 1 and 2. Thus, the communication interface 302 may be configured to receive input data from one or more computing devices, and may also be configured to send output data to the one or more computing devices. In some examples, the communication interface 302 may also maintain and manage data and data records received and sent by the server 300. In other examples, data records may be maintained and managed by other components of the server 300.

The location module 304 may be configured to receive data from a computing device. Further, the location module 304 may determine a geographic location of the computing device. The determination may be based on data from an accelerometer, gyroscope, and/or other sensors of the computing device. The location module 304 may determine and store a history of sensor measurements of the computing device. In such instances, the location module 304 may reprocess such measurements based on updated data from networks and/or information used to determine the locations.

The data storage 308 may store program logic 312 that can be accessed and executed by the processor 306. The data storage 308 may also include a location database 314. In some instances, the location database 314 may be accessed by the processor 306 to retrieve information regarding wireless access points, locations of satellites in a GPS network, floor plans of a building, and any other type of information useful for determining a location of a computing device, among other possibilities.

The server is illustrated with a second processor 316 which may be an application processor and/or a specific processor for input/output functionality. In some instances, functions of the processor 306 and the processor 316 may be combined and carried out by one or both of the processors.

In some embodiments, measurements may be collected from various sensors of a computing device such as Wi-Fi components, GPS sensors, and/or inertial sensors, among other possibilities. In some instances, such measurements may be combined with information from external databases such as Wi-Fi signal information or modeling information, location information or Wi-Fi access point information, and/or building information (e.g., floor plans information). Further, such measurements and/or information may be used to estimate a proximate location or movement of the computing device in real-time. By recording or analyzing the real-time location estimates at all times or multiple time intervals, the estimations may be used to produce a location history.

III. Example Methods

Figure 4:
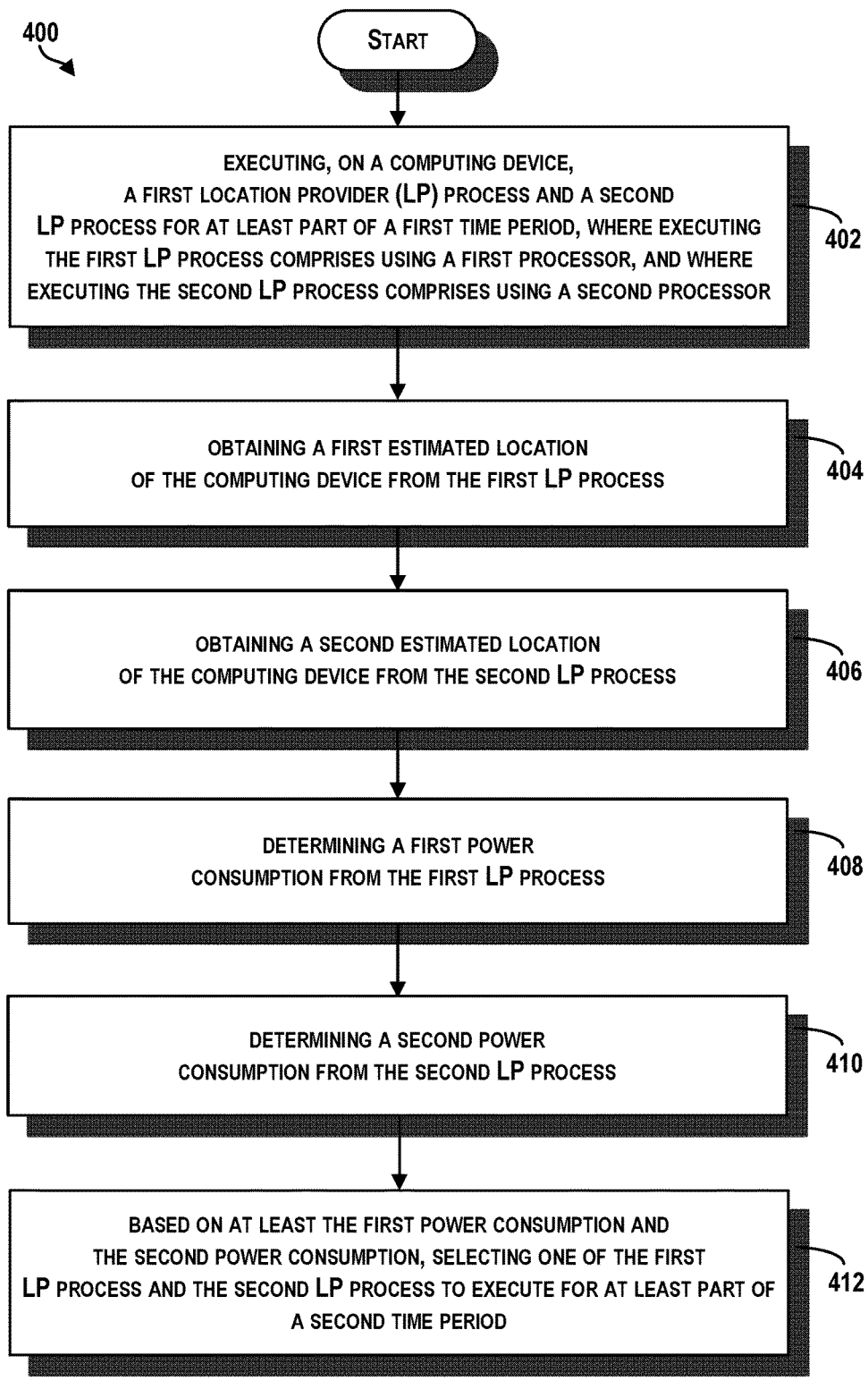
FIG. 4 is a flow chart, according to an example implementation.

FIG. 4 is a flow chart, according to example implementations. Method 400 may be carried out, for example, in any manner described above in relations to FIGS. 1 through 3. For example, the blocks and implementations of methods 400 and 700 may be carried out by the system 100 in FIG. 1, the computing device 200 in FIG. 2, and/or the server 300 in FIG. 3.

Method 400 may include one or more operations, functions, or actions as illustrated by one or more of blocks 402 through 412. Although the blocks are illustrated in a sequential order, these blocks may also be performed in parallel, and/or in a different order than those described herein. Also, the various blocks may be combined into fewer blocks, divided into additional blocks, and/or removed based upon specific implementations.

In addition, for the method 400, other processes, and other implementations disclosed herein, the flow charts show functionality and possible implementations of present embodiments. In this regard, each block may represent a module, a segment, or a portion of program code, which includes one or more instructions executable by a processor for implementing logical functions or steps. The program code may be stored on any type of computer-readable medium, for example, such as a storage device including a disk or hard drive.

The computer-readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400, other processes, and other methods disclosed herein, each block in FIG. 4 may correspond to hardware, chipsets, and/or circuitry that are designed or wired to perform the specific logical functions in the processes.

Implementations of the method 400 may be performed by a computing device (or components of a computing device such as one or more processors), or may be distributed across multiple computing devices and/or a server. In some examples, the computing device may receive data or information from sensors of the computing device. Further, in some instances, the computing device may be a server such that the information may be received from another device that collects the information.

At block 402 of FIG. 4, the method 400 may include executing, on a computing device, a first location provider (LP) process and a second LP process for at least part of a first time period, where executing the first LP process includes using a first processor, and where executing the second LP process includes using a second processor. The first and second LP processes may include, for example, any of the LP processes as described above in relation to FIGS. 1 through 3. For example, the first LP process may run using the processor 214 and the second LP process may run using the second processor 222. Further, the processor 214 may consume more power than the second processor 222. Yet further, executing the first LP process may include running a software process and executing the second LP process may include running a hardware process. In addition, the first LP process may include a fused location provider (FLP), as described above in relation to FIG. 2.

In some implementations, the first LP process may involve modeling Wi-Fi signals, accessing Wi-Fi databases, and/or determining estimated locations based on one or more known wireless access points within a wireless range of the computing device. Further, the second LP process may involve determining an estimated location of computing device based on accessing low-level data available in hardware, e.g., GPS pseudo ranges. Yet further, the first and/or the second LP processes may involve fusing the GPS pseudo ranges with Wi-Fi signal modeling, among other possibilities.

In some implementations, the first and second LP processes may involve receiving outputs from sensors of the computing device, possibly fusing outputs to determine a probability or an estimated location of the computing device. Using one or more of the outputs from the sensors (e.g., WiFi scan data, temperature readings, magnetometer readings, etc.), various comparisons and mapping may determine estimated locations of the computing device. For example, the computing device may determine a particular set of data based on a Wifi scan, a temperature reading, and a magnetometer reading when the computing device is located outside between two given buildings. As such, when the computing device determines this particular set of data, the computing device may determine its proximate location to be outside between the two buildings.

At block 404, the method 400 may include obtaining a first estimated location of the computing device from the first LP process. At block 406, the method 400 may include obtaining a second estimated location of the computing device from the second LP process.

Estimated locations may be determined, for example, in any manner described above in relation to FIGS. 1 through 3. For example, the first estimated location of the computing device may be determined from running the first LP process on an application processor. Further, the processor 214 may be an application processor that runs the first LP process to determine the first estimated location of the computing device. Yet further, the second estimated location of the computing device may be determined from running the second LP process on the second processor. In addition, the processor 222 may be the second processor that runs the second LP process to determine the second estimated location of the computing device, where the second processor may consume less power than the application processor.

At block 408, the method 400 may include determining a first power consumption of the computing device from the first LP process. At block 410, the method 400 may include determining a second power consumption from the second LP process. In some instances, the first power consumption may be based on using the first processor to determine the first estimated location. Further, the second power consumption may be based on using the second processor to determine the second estimated location.

In some instances, the method 400 may include receiving an indication of a battery power level of the computing device falling below a threshold level. Further, based on the battery power level falling below the threshold level, the method 400 may include disabling one of the first LP process and the second LP process.

At block 412, the method may include, based on at least the first power consumption and the power second consumption, selecting one of the first LP process and the second LP process to execute for at least part of a second time period. For example, the first power consumption based on the application process may be greater than the second power consumption based on the second processor. Further, the second LP process may be determined to run for another time period, possibly to save power in a battery of the computing device. Yet further, the second LP process may be determined to run to maintain a battery power level of the computing device.

In some embodiments, an indication of a battery power level of the computing device falling below a threshold level may be received. Further, based on the battery power level falling below the threshold level, one of the first LP process and the second LP process may be disabled. For example, based on the battery power level falling below the threshold level, the first LP process may be disabled and the second LP process may continue to run on the computing device.

In some embodiments, the method 400 may include disabling one of the LP processes. In some instances, disabling one of the first LP process and the second LP process may involve deactivating power in certain components of the computing device. For example, referring back to FIG. 2, disabling the hardware process may involve deactivating power to the sensor(s) 210 and/or GPS 208. In some instances, disabling an LP process may also involve deactivating power to wireless communication component 204 and cellular radio communication component 206. Further, disabling the LP process may involve ending or terminating one or more processes or algorithms executed by an application processor. As noted, for example, LP processes may be implemented with FLPs. For disabling such processes, a callback mechanism used to call each batched location may be terminated.

As a general matter, disabling one of the first LP process and the second LP process may reduce the power consumed by the computing device. Further, both the first and second LP processes may be disabled during some time periods to further reduce the power consumed by the computing device. In some implementations, when disabling one of the first process and the second process, the disabled LP process may be disabled for periods of time, e.g., one to two days, possibly to reduce or avoid switching between the LP processes. In some instances, switching between the first LP process and the second LP process may output sporadic locations of the computing device, possibly causing "jumpiness" of the blue dot as described in the scenarios above.

FIG. 5 illustrates a motion model, according to an example implementation. The motion model may include data 500 and multiple records or sets of additional data. Further, data 500 may be stored, for example, in any computing device described above in relation to FIGS. 1 through 3. For example, data 500 may be part of a motion model stored in data storage 212 of the client device 200. Yet further, data 500 may be part of a motion model stored in data storage 308 of the server 300, among other possibilities.

In some embodiments, a motion model may include various forms of data. Further, the motion model may include data obtained from running LP processes. In particular, the motion model may include data obtained from running LP processes that use accelerometers, gyroscopes, magnetometer pedometer, light sensors, microphone, camera, or other location and/or context-aware sensors. Yet further, the motion model may include data from running LP processes on one or more processors. For example, the motion model may include data from running the first LP process on processor 214.

As shown in FIG. 5, data 500 may include various types of data including activity data 502, sensor data 504, sensor data 506, dead reckoning data 508, and location data 510, among other possible types of data. Activity data 502 may be indicative of an estimated activity of a user carrying a computing device. In some instances, the motion model may be based on the estimated activity of the user of the computing device. Yet further, in some instances, the estimated activity of the user may be based on the location data 510 associated with the computing device.

Sensor data 504 and 506 may include data from one or more sensors. For example, sensor data 504 and 506 may, for example, be output by one or more sensors 210 of client device 200 described above in relation to FIG. 2. Dead reckoning data 508 may be indicative of one or more directions the computing device. In addition, dead reckoning data 508 may, for example, be output by one or more sensors 210 of client device 200 as described above in relation to FIG. 2. Location data 510 may be indicative of one or more expected locations of the computing device. In particular, location data 510 indicative of the one or more expected locations of the computing device may be based on the activity data 502, sensor data 504 and 506, and dead reckoning data 508.

In some embodiments, activity data 502 may include activity recognition data of the computing device that indicates an activity and a direction of a motion of the computing device. As such, in some instances, the motion model of the computing device may be based on the activity and the direction of the motion of the computing device.

For example, data entry 512 may include activity data 518, motion data 520, and location data 526. In this example, consider a scenario in which activity data 518 corresponds to a user driving a vehicle while carrying the computing device, possibly driving the vehicle from the user's home to the user's work place. As such, motion data 520 may correspond to a velocity, an acceleration, and/or a movement of the computing device, indicative of driving the vehicle from the user's home to the user's work place. In addition, location data 526 may correspond to various locations of the computing device between the home and the work place.

Further, data entry 514 includes activity data 528, temperature data 532, and location data 536. In this example, consider a scenario in which activity data 528 corresponds to a user carrying the computing device and leaving the work place for lunch, possibly exiting a work building to go outside the work building. As such, temperature data 532 may correspond to a temperature of the air around the computing device. For example, referring back to FIG. 2, the sensors 210 of the client device 200 may detect the outdoor temperature or possibly a change from the indoor temperature to the outdoor temperature. In addition, location data 536 may correspond to one or more proximate locations of the computing device outside of the work building.

Yet further, data entry 516 includes activity data 538, motion data 540, direction data 544, and location data 546. In this example, consider a scenario in which activity data 538 corresponds to the user carrying the computing device on the way to a cafeteria for lunch. For instance, consider the scenario above such that the cafeteria is in walking distance from the work building. As such, motion data 540 and direction data 544 may be used to determine the direction and the path the user is walking to get to the cafeteria. As such, location data 546 may correspond to one or more proximate locations of the computing device along the path from the work building to the cafeteria.

As noted for FIG. 4, method 400 may include disabling one of the LP processes. For example, consider the scenario in which activity data 538 corresponds to the user carrying the computing device to the cafeteria. In such instances, the first and second estimated locations indicated by the first and second LP processes, respectively, may determine estimated locations close to expected locations 546. As such, the second LP process may be determined to accurately output the estimated locations of the computing device. As such, the first LP process may be disabled, possibly to reduce the power consumed by the computing device.

It should be noted that data records 522, 524, 530, 534, and 542 may be empty. Yet, these records may include data, possibly related to one or more machine-learning processes of the motion model. Further, data may be added to and/or removed from the motion model over time, possibly adjusting to the user's day-to-day activities. In particular, multiple other data entries may be added to data entries 512, 514, and 516 as part of the motion model. In addition, multiple other data types may be added to activity data 502, sensor data 504 and 506, dead reckoning data 508, and location data 510 as part of the motion model of the computing device. For example, the motion model may also include magnetometer data, barometer data or changes in barometer readings. In addition, the motion model may include gyroscope data indicating rotational and/or circular movements of the computing device. Further, the motion model may include data that indicates the position and/or orientation of the computing device. Yet further, the data may indicate that one or more positions of the computing device relative to a user have changed. In particular, the data may indicate that the one or positions have changed based on the data indicating the inaccuracy of dead reckoning measurements.

In some embodiments, data in a motion model may be analyzed. For example, data 500 of the motion model may be analyzed in an iterative manner. For instance, data associated with a given confidence level may be analyzed. Further, data associated with a lower confidence may be analyzed until all or most of the data 500 is considered. As such, a priority for analyzing the data 500 may be performed in a number of ways. In a further example, the data 500 may be prioritized by determining that GPS data indicates one or more estimated locations also indicated by the dead reckoning data 508. In particular, GPS data may indicate a given location and the dead reckoning data also indicate the given location. As such, the dead reckoning data may be added to the motion model.

It may be possible to distribute steps of method 400 between client device 200 and server 300. For example, client device 200 may run a first LP process and a second LP process to determine first estimated locations of the client device 200. Further, server 300 may determine the motion model of the computing device that provides the expected locations of the client device 200.

Figure 6:
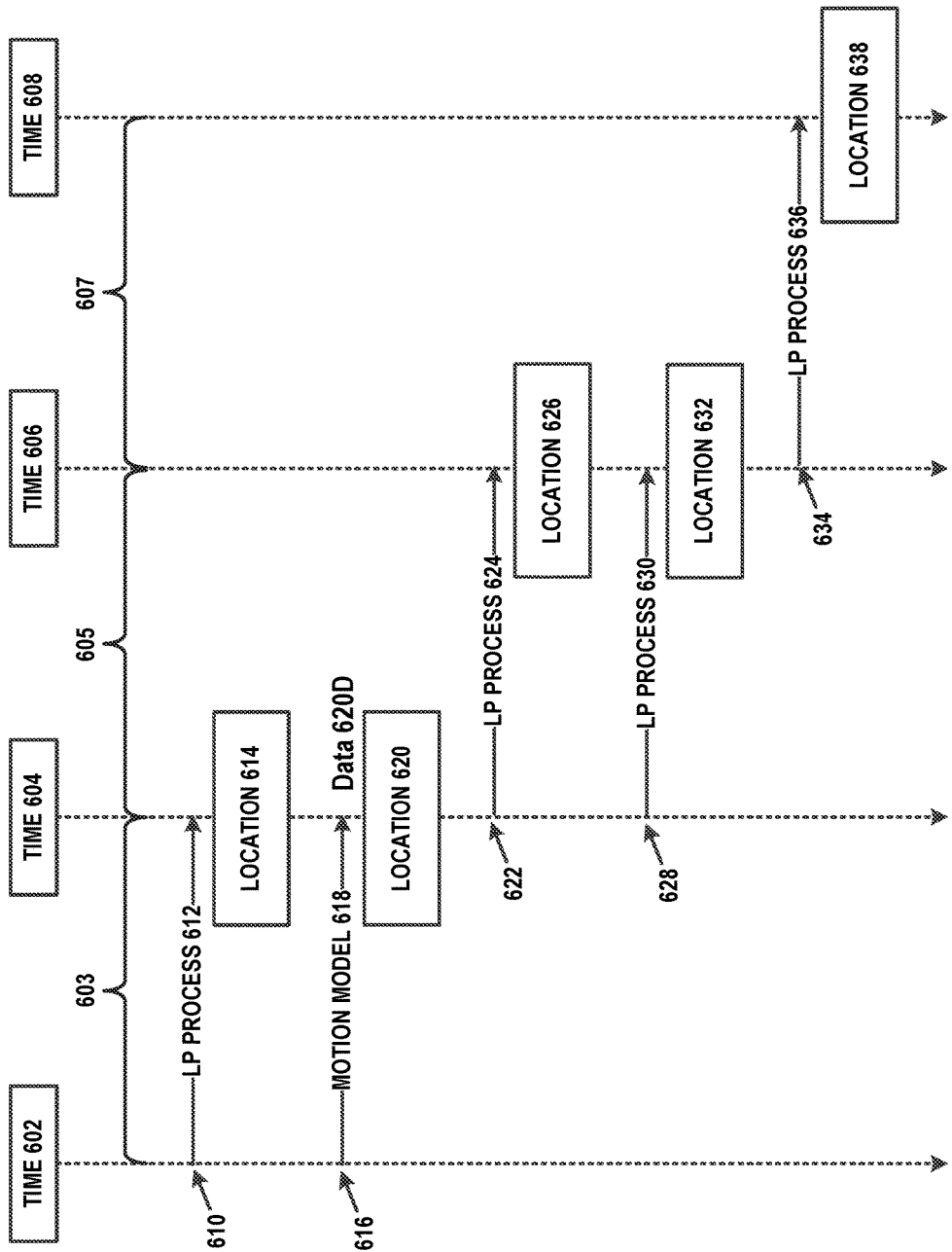
FIG. 6 is a process chart, according to an example implementation.

FIG. 6 is a process chart, according to an example implementation. As shown, FIG. 6 illustrates times 602, 604, 606, and 608. Further, time period 603 illustrates the time between times 602 and 604. Yet further, time period 605 illustrates the time between times 604 and 606. In addition, time period 607 illustrates the time between times 606 and 608. As such, an LP process may run during at least part of one or more of the time periods 603, 605, and 607.

In some embodiments, LP processes 612, 624, 630, and 636 may be, for example, the LP processes described above in relation to FIGS. 1 through 5. In some instances, one or more of the LP processes 612, 624, 630, and 636 may involve determining estimated locations of a computing device. For example, one or more of the LP processes 612, 624, 630, and 636 may determine the estimated locations based on accessing low-level data available in hardware (e.g., GPS pseudo ranges). Further, one or more of the LP processes 612, 624, 630, and 636 may determine the estimated locations based on accessing large Wi-Fi databases and identifying proximate locations of one or more known wireless access points within a wireless range of the computing device.

In some embodiments, one or more of the LP processes 612, 624, 630, and 636 may run on a first processor of a computing device, possibly to determine an estimated location of the computing device. Further, LP processes 612, 630, and 636 may run on a second processor of the computing device, possibly to determine estimated locations of the computing device.

As shown in step 610 of FIG. 6, the LP process 612 may run on a computing device for at least part of a time period to determine an estimated location 614 of the computing device. In particular, the LP process 612 may run for at least part of the time period 603 illustrated between times 602 and 604. As shown in step 616, a motion model 618 may provide data 620D indicating expected locations 620 of the computing device. In some instances, data 620D may take, for example, the form of data 500 described above in relation to FIG. 5. For example, data 620D may take, for example, the form of location data 526, 536, and/or 546. As such, the motion model 618 may provide expected locations 620 of the computing device.

Further, as shown in step 622 of FIG. 6, an LP process 624 may run on the computing device for at least part of time period 605 to determine an estimated location 626 of the computing device. In particular, LP process 624 may run for at least part of the time period 605 illustrated in between times 604 and 606. In some instances, the locations 614 and 626 may be compared to determine the accuracy of the LP processes 612 and 624, respectively.

Yet further, as shown in step 628 of FIG. 6, an LP process 630 may run on the computing device for at least part of time period 605 to determine an estimated location 632 of the computing device. In particular, the LP process 630 may run for at least part of the time period 605 illustrated in between times 604 and 606. In some instances, running both a first LP process 624 and a second LP process 630 for at least part of the given time period 605 may relate to block 402 of FIG. 4. As such, in some instances, the LP process 624 may run using a first processor of the computing device. Further, the LP process 630 may run using a second processor of the computing device. As such, estimated locations 626 and 632 may be determined by the LP processes 624 and 630, respectively.

Referring back to FIG. 4, the method 400 may include the motion model 618 of the computing device providing expected locations 620 of the computing device. Further, the method 400 may include comparing the first estimated location 626 and the second estimated location 632 with the expected location 620. Further, the method 400 may include disabling the first LP process 624 based on the second estimated location 632 being within a threshold distance around the expected location 620. In particular, if location 632 is closer to expected locations 620, then the LP process 624 may be disabled from running on the first processor and reducing the power consumption of the computing device. As such, as shown in step 634, LP process 636 may run using the second processor for a period of time 607 to determine an estimated location 638 of the computing device. In particular, LP process 636 may run for the time period 607 illustrated in between times 606 and 608.

Yet further, location 626 may be closer to expected location 620. For example, consider that LP process 630 involves receiving a GPS signal and an object (e.g., a building or the construction of the building) obstructs the GPS signal to the computing device. As such, the location 632 may be farther away from the expected location 620 than location 626 is from the expected location 620. Thus, LP process 630 may be disabled based on the comparison. In such instances, LP process 624 run on the first processor, possibly consuming more power than the second processor. Yet, the estimated location 626 may be more accurate than estimated location 632. As such, LP process 624 may continue to run after the time period 605.

In addition, the method 400 may include receiving outputs from an accelerometer of the computing device. As such, the method 400 may also include determining changes in proximate locations of the computing device using the outputs from the accelerometer. Further, the method may include determining an estimated activity of a user of the computing device based on the changes in location of the computing device. Yet further, the method may include determining the expected locations 620 of the motion model 618 based on the estimated activity of the user. Further, the method 400 may also include making a second comparison of the estimated location 638 with expected location 620 of motion model 618. In addition, the method 400 may include enabling and/or disabling LP process 636 for another time period based on the second comparison, among other possibilities.

Figure 7:
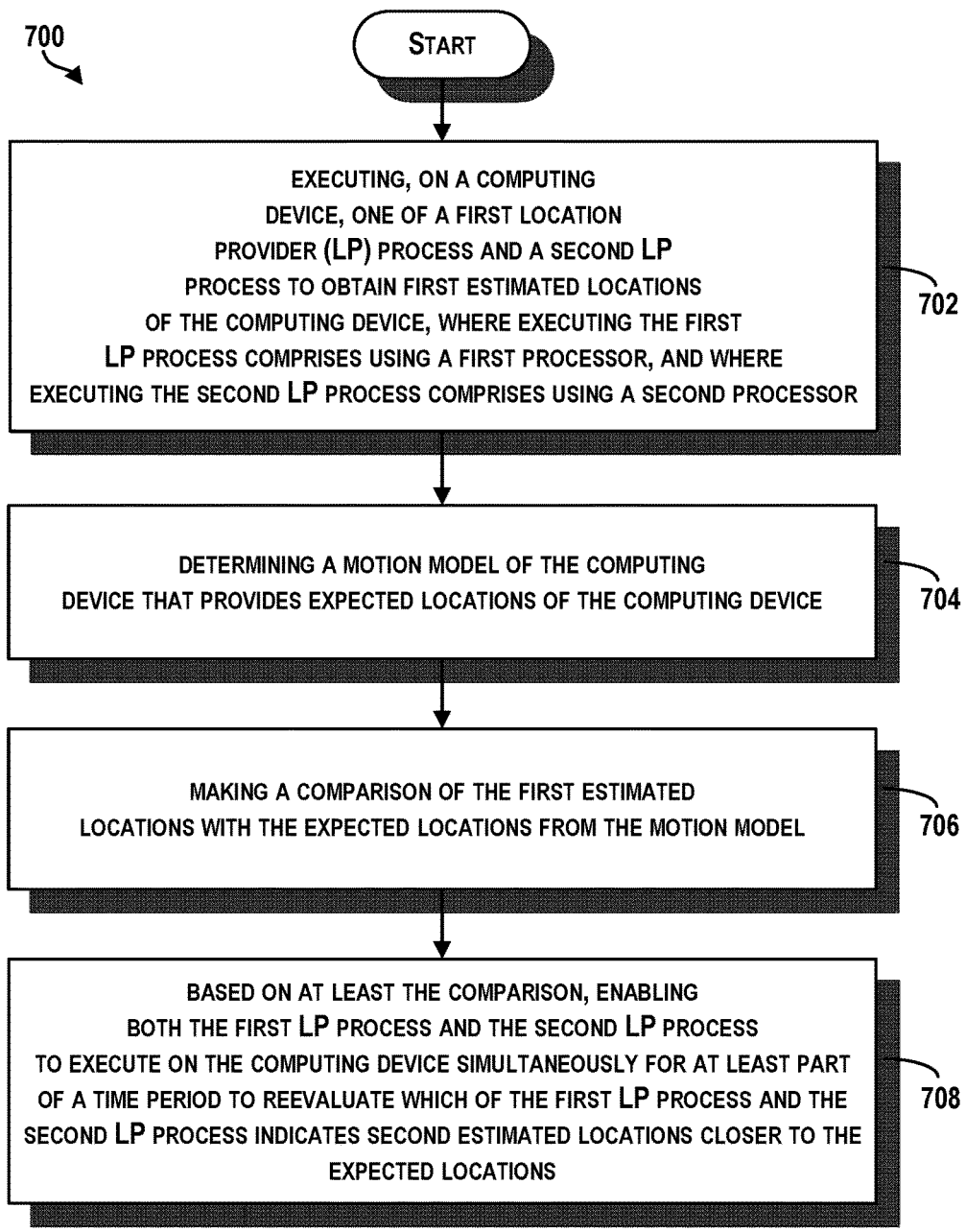
FIG. 7 is another flow chart, according to an example implementation.

FIG. 7 is another flow chart, according to an example implementation. At block 702, the method 700 includes executing, on a computing device, one of a first location provider (LP) process and a second LP process to obtain first estimated locations of the computing device, where executing the first LP process includes using a first processor, and where executing the second LP process comprises using a second processor. The first LP process and the second LP process may be any of the LP processes described above in relation to FIGS. 1 through 6.

Further, block 702 may be illustrated by step 610 of FIG. 6. For example, a computing device may run one of the first LP process 612 and the second LP process 630. The first LP process 612 may provide the first estimated location 614 of the computing device. Further, the second LP process 630 may provide the estimated location 632 of the computing device. Yet further, the first LP process 612 may run on an application processor of the computing device and the second LP process 630 may run on a second processor of the computing device. In some instances, the second LP process 630 may run for more time periods than the first LP process 624, possibly to reduce the power consumed by the application processor.

In some instances, one or more of the estimated locations of the computing device may be inaccurate. For example, with less than ideal conditions for using LP processes 630 and 636, the accuracy of estimated locations 632 and/or 638 of the computing device, respectively, may be reduced. Consider one or more of the scenarios above where the computing device displays a map and the blue dot indicating the estimated location of computing device jumps around on the map. In such instances, the LP process 624 may run to provide estimated location 626 that may be more accurate than other estimated locations, where the application processor of the computing device may consume more power than the second processor.

At bock 704, the method 700 may include determining a motion model of the computing device that provides expected locations of the computing device. The motion model may, for example, be determined in any manner described above in relation to FIG. 5. In particular, referring back to FIG. 5, the motion model may be determined based on the data 500 of the motion model including activity data 502, sensor data 504 and 506, dead reckoning data 508, and location data 510, where location data 510 may provide the expected locations of the computing device.

In some embodiments, the computing device may determine the motion model based on outputs from an accelerometer of the computing device. For example, consider one or more the scenarios above in which the user drives the vehicle while carrying a computing device, possibly from the user's home to the user's work place. Further, the computing device may, for example, take the form of client device 200 from FIG. 2. As such, computing device may include an accelerometer as part of the sensors 202. Thus, motion data 520 may correspond to a velocity, an acceleration, and/or a movement indicative of the computing device moving from the user's home to the user's work place.

In some embodiments, the computing device may determine the motion model based on changes in location. For example, the computing device may determine the changes in location using the outputs from the accelerometer. For example, the location data 526 may be determined using the outputs from the accelerometer. Yet further, the location data 526 may correspond to various locations or changes in location of the computing device as the user drives from the home to the work place.

In some embodiments, the computing device may determine the motion model in other ways. For example, the computing device may determine an estimated activity of a user based on the changes in location of the computing device. Further considering the one or more scenarios above, the activity data 518 may correspond to an estimated activity of the user driving the vehicle with the computing device from the user's home to the user's work place. In particular, the estimated activity may be based on the changes in location of the computing device, possibly changing rapidly due to the speed of the vehicle. As such, the motion model may be determined based on this estimated activity of the user driving the vehicle.

Further, the computer device may determine the motion model based on dead reckoning estimations. For example, referring back to FIG. 5, consider the scenario in which the activity data 538 corresponds to the user carrying the computing device to the cafeteria. Sensors in the computing device, such as sensors 210 in client device 200, may output motion data 540 and direction data 544 of dead reckoning data 508. In some instances, this data may be used to determine a direction and a path that the user is walking on to get to the cafeteria. As such, data 500 of the motion model may be determined based on the direction of motion of the computing device.

Further, block 704 of FIG. 7 may be illustrated by step 616 of FIG. 6. For example, the motion model 618 of the computing device may provide the expected locations 620 during the time period 603. Yet, the expected locations 620 may be provided during other possible time periods 605 and 607 as well. Further, the motion model 618 may provide expected locations of the computing device before time 602 and/or after time 608.

At block 706, the method 700 may include making a comparison of the first estimated locations with the expected locations from the motion model. For example, referring back to FIG. 5, the first estimated locations may be compared with one or more of expected locations 526, 536, and 546 of the motion model in FIG. 5.

Further, block 706 may be illustrated by steps 610 and 616 of FIG. 6. For example, a comparison of the first estimated locations 614 may be made with expected location 620 from the motion model 618. Further, in some instances, a comparison of the estimated locations 626, 632, and 638 may be made with expected location 640 from the motion model 618, among other possibilities.

At block 708, based on at least the comparison, the method 700 may include enabling both the first LP process 624 and the second LP process 630 to run on the computing device simultaneously for at least part of the time period 605 to reevaluate which of the first LP process 624 and the second LP process 630 indicates second estimated locations 626 and 632, respectively, are closer to the expected locations 620. For example, consider a scenario in which the second LP process 630 provides the estimated locations 632 that are closer to expected location 620 than that of the first LP process 624. In such instances, the LP process 636 may run to provide the estimated location 638 during the time period 607, where the LP process 636 may run using the second processor. In some implementations, the LP processes 630 and 636 may run on the second processor, possibly to reduce the power consumed by the computing device.

In some instances, the second LP process 630 may provide the estimated location 632 indicative of a proximate location of the computing device more accurately compared to the first LP process 624. As such, the first LP process 624 may be disabled, possibly to minimize or eliminate the power drawn by the application processor used to run the first LP process 624. In some instances, the first LP process 624 may provide estimated locations 626 indicative of the proximate location of the computing device more accurately compared to the second LP process 630. As such, the second LP process 630 may be disabled, possibly to minimize or eliminate the power drawn by the second processor used to run the second LP process 630.

Figures 8A, 8B:
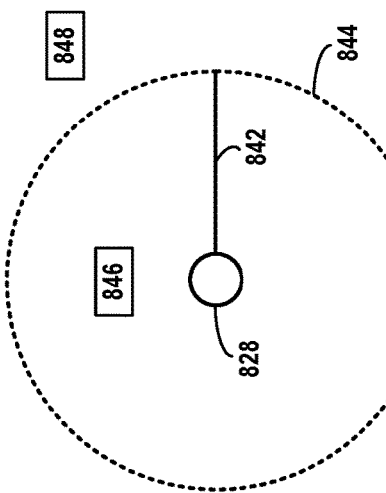
FIG. 8A illustrates data, according to an example implementation.
FIG. 8B illustrates a threshold distance, according to an example implementation.

FIG. 8A illustrates data, according to an example implementation. For example, data 800 may be stored, for example, in any computing device described above in relation to FIGS. 1 through 7. In some instances, data 800 may be part of a motion model stored in data storage 212 of the client device 200. Yet further, data 800 may be part of a motion model stored in data storage 308 of the server 300, among other possibilities.

In some instances, data 800 may include LP data 802, LP data 804, motion model data 806, and threshold data 808. The threshold data 808 may be determined, for example, in any manner described above in relation to FIGS. 1 through 7. Further, the LP data 802 may correspond to, for example, LP processes 612 and 624. Further, LP data 804 may correspond to LP processes 630 and 636. Yet further, motion model data 806 may correspond to data 620D provided by the motion model 618. In particular, data entries 810, 812, and 814 may include data indicative of estimated locations 820, 828, and 834, respectively, that correspond to expected location 620 of the computing device provided by the motion model 618.

In addition, data entries 810 through 814 may include, for example, data indicating the estimated locations of the computing device described above in relation to FIG. 6. In particular, data entry 810 may include data indicative of an estimated location 816 that corresponds to estimated location 614. Further, data entry 812 may include data indicative of estimated locations 824 and 826 that correspond to estimated locations 626 and 632, respectively. Yet further, data entry 814 may include data indicative of estimated location 832 that corresponds to estimated location 638. In addition, data entries 810 and 814 may include empty data records 818 and 830 that may be filled with data indicative of estimated locations of the computing device.

Further, data entries 810 through 814 may include, for example, data indicating expected locations of the computing device described above in relation to FIG. 6. For example, data entry 810 may include data indicative of expected location 820 that corresponds to an expected location provided by the motion model 618, possibly before time 602. Further, data entry 812 may include data indicative of expected location 828 that corresponds to the expected location 620. Yet further, data entry 814 may include data indicative of expected location 834 that corresponds to an expected location provided by the motion model 618, possibly after time 606.

In addition, data entries 810, 812, and 814 may include threshold data 808. For example, data entry 810 may include data indicative of a threshold distance 822, data entry 812 may include data indicative of a threshold distance 830, and data entry 814 may include data indicative of a threshold distance 836.

In some implementations, a comparison of estimated locations 824 and 826 may be made with the expected location 828 of the motion model data 806. Based at least on this comparison, a first LP process and a second LP process may be enabled to run on the computing device simultaneously for a time period. In particular, the first LP process and the second LP process may run to reevaluate which of the first LP process and the second LP process indicates estimated locations closer to the expected location 834.

FIG. 8B illustrates an example threshold distance. As shown in FIG. 8B, threshold distance 842 may correspond to one or more threshold distances 822, 830 and 836 in FIG. 8A. Further, as shown in FIG. 8B, expected location 828 may correspond to the expected locations 820, 828, and 834 in FIG. 8A. For illustrative purposes, expected locations 820, 828, and 834 are shown as a single circle. Thus, it should be noted that expected location 828 may represent multiple expected locations of the computing device.

As shown in FIG. 8B, a threshold distance 842 around expected locations 828 may establish a region 846. Thus, any location within the region 846 may be within the threshold distance 842 around the expected locations 828 indicated by the motion model 806. Further, the distance 842 around expected location 828 may establish a region 848 that is outside of the threshold distance 842.

As noted in one or more scenarios above, a first LP process and a second LP process may run to provide a first estimated location and a second estimated location of a computing device, respectively. In some instances, the first LP process may be disabled based on the second estimated location being within a threshold distance 842 around the expected location 828. Further, the first LP process may be disabled based on the estimated locations 816 and 824 indicating locations beyond one or more of the threshold distances 822, 830, and 836 from the expected locations 828. Yet, in some instances, the first LP process may be disabled based on the remaining power in the computing device. In such instances, the first estimated location may be closer to the expected location 828 than the second estimated location.

In some instances, the second LP process may be disabled based on the first estimated location being within a threshold distance 842 around the expected location 828. Further, the second LP process may be disabled based on the estimated location 826 and 832 indicating locations beyond one or more of the threshold distances 822, 830, and 836 from the expected locations 828.

Referring back to FIG. 7, the method 700 may also include receiving information indicating a battery power level of the computing device. Based on the battery power level being below a threshold amount, the method 700 may include disabling the first LP process and/or the second LP process. As such, the power level of the computing device may be preserved or conserved.

In some implementations, the method 700 may include receiving a request for location information from an application running on the computing device. Based on a quality of data required by the application, a first LP process and/or a second LP process may be selected to run on the computing device. For example, a restaurant application may search and identify certain restaurants in the vicinity of the computing device. In particular, the restaurant application may require accurate location information. As such, the first LP process and/or the second LP process may be selected to run on the computing device to meet the required accuracy for the application to run properly.

Further, the method 700 may also include making a determination that the estimated locations 816 and 824 of the computing device are outside of one or more threshold distances 822, 830, and 836 around the expected locations 828. For example, the estimated location 816 may be outside of a threshold distance 842 around the expected locations 828 indicated by the motion model 806. Responsive to such determinations, both the first LP process and the second LP process may be enabled to run on the computing device simultaneously to reevaluate which of the first LP process and the second LP process provides estimated locations of the computing device that are closer to expected locations 828 indicated by the motion model data 806.

Yet further, the method 700 may also include determining that one of the first LP process and the second LP process running on the computing device stops reporting locations for a given period of time. As such, the method 700 may include enabling both the first LP process and the second LP process to run on the computing device simultaneously to reevaluate which of the first LP process and the second LP process provides outputs indicative of locations of the computing device that are closer to the expected locations 828 indicated by the motion model 806.

In some instances, the method 700 further may include, after expiration of a given time period, running on the computing device both the first LP process and the second LP process simultaneously for at least part of another time period to provide additional estimated locations of the computing device. Further, a second comparison of the additional estimated locations may be made with the expected locations of the motion model. Further, one of the first LP process and the second LP process may be disabled based on the second comparison.

Figure 9:
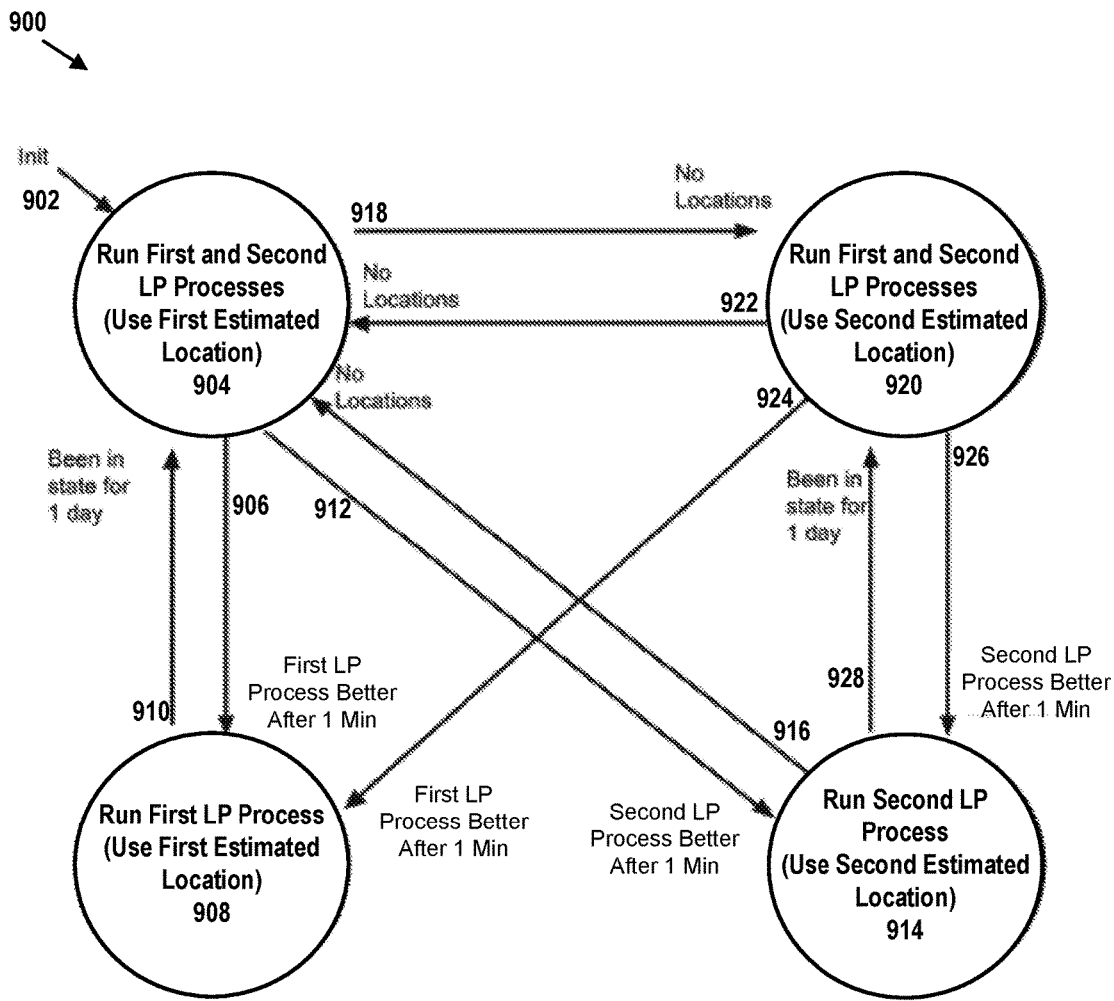
FIG. 9 is another process chart, according to an example implementation.

FIG. 9 is another process chart, according to an example implementation. At step 902, the process may be initialized. At steps 904 and 920, both first and second LP process may run on a computing device for at least part of a given time period. Further, both the first and second LP processes may run to determine first and second estimated locations of the computing device, respectively. As such, the processes in FIG. 9 may, for example, be implemented in any manner in relation to FIGS. 1 through 8. In particular, steps 904 and 920 may correspond to, for example, block 402 of FIG. 4 and block 702 of FIG. 7, among other possibilities.

The first estimated location may be used instead of the second estimated location, possibly after comparing the first and second estimated locations to the expected locations indicated by the motion model. Yet further, at step 906, the first LP process may, for example, run better for approximately one minute. In particular, the first estimated location may be closer to the expected locations of the computing device compared to the second estimated location. Thus, the second LP process may be disabled.

At step 908, the first LP process may run on the computing device to determine or refresh the first estimated locations of the computing device. Further, at step 910, the first LP process may, for example, run for approximately 24 hours or a single day. As such, returning to step 904, both the first LP process and the second LP process may run on the computing device. At step 912, the second LP process may, for example, run better for approximately one minute. In particular, the second estimated locations may be closer to the expected locations of the computing device than the first estimated location. Thus, the first LP process may be disabled.

At step 914, the second LP process may run on the computing device to determine or refresh the second estimated locations of the computing device. Yet, at step 916, no second estimated locations of the computing device may be provided. The second LP process running on the computing device may stop providing the second estimated locations for a given period of time. As such, returning to step 904, both the first LP process and the second LP process may run on the computing device. At step 918, no first estimated locations of the computing device may be provided. The first LP process running on the computing device may stop providing first estimated locations for a given period of time.

As noted for step 920, both the first and second LP processes may run on the computing device simultaneously to determine the first and second estimated locations, respectively. The second estimate location may be used instead of the first estimated location, possibly after comparing the first and second estimated locations to the expected locations indicated by the motion model. Yet further, at step 926, the second LP process may, for example, run better for approximately one minute. In particular, the second estimated location may be closer to the expected locations of the computing device than the first estimated locations. Thus, the first LP process may be disabled.

As noted for step 914, the second LP process may run on the computing device to determine the second estimated location of the computing device. Further, at step 928, the second LP process may, for example, run for approximately 24 hours or a single day. As such, returning to step 920, both the first LP process and the second LP process may run on the computing device. Yet further, at step 924, the first LP process may, for example run better for approximately one minute. In particular, the first estimated locations may be closer to the expected locations of the computing device than the second estimated locations. Thus, the second LP process may be disabled. Further, returning to step 910, the first LP process may, for example, run for approximately 24 hours or a single day. As such, returning to step 904, both the first LP process and the second LP process may run on the computing device. As such, the process may continue at step 904, as described above.

It should be noted that the process 900 above is provided for illustrative purposes and various other processes may also be possible. In particular, logic may be added to process 900 to determine other processes. For example, at step 904, depending on whether the first LP process or the second LP process runs better for a particular time period, steps 906 or 912 may be carried out, respectively. Yet further, at step 904, if the first LP process 624 stops providing first estimated locations for a given period of time, then steps 918 and 920 may be made, among other possibilities.

IV. Additional Example Systems, Methods, and/or Computing Devices

Figure 10:
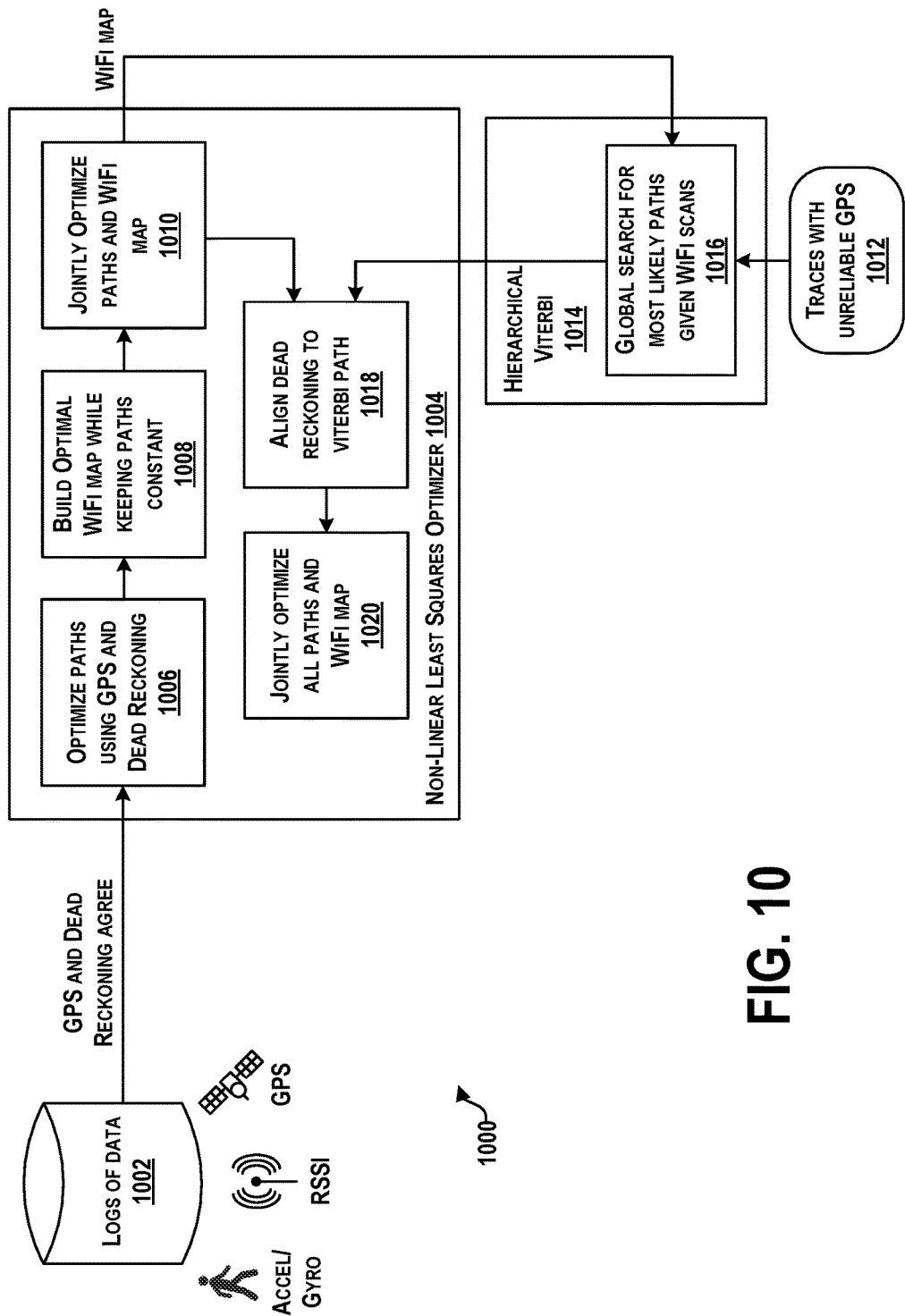
FIG. 10 illustrates another system, according to an example implementation.

FIG. 10 illustrates another system 100, according to an example implementation. Any of the blocks in the system 1000 may be modules, processors, or other devices, or may take the form of instructions executable by processors to perform the associated functions. In the system 1000, logs of data 1002 may be received from computing devices such as the computing devices described above in relation to FIGS. 1 through 9. The logs of data may include data generated from LP processes running on a computing device involving, for example, GPS data, accelerometer data, and gyroscope data. Further, the logs of data may include data generated from additional LP processes running on a computing device such as received signal strength indication (RSSI) data, possibly from each unique wireless access point used to determine a distance from each wireless access point. Further, such logs of data may be associated with timestamps as collected by respective computing devices.

The logs of data for which dead reckoning data and GPS data indicate similar locations may be provided to a non-linear least squares optimizer 1004, for example. Logs of data for which the dead reckoning data and the GPS location do not indicate similar locations may be rejected as erroneous data or data with too much noise. The non-linear least squares optimizer 1004 may optimize paths using GPS and dead reckoning, as shown at block 1006 and as described above using for example a series optimizer, and then build optimal Wi-Fi maps while keeping the paths constant, as shown at block 1008. The non-linear least squares optimizer 1004 may further jointly optimize paths and Wi-Fi maps using a simultaneous localization and mapping (SLAM) optimization and output a Wi-Fi map, as shown at block 1010.

Traces of data with unreliable GPS data (at block 1012) may be received at a hierarchical Viterbi processor 1014 to perform a global search for most likely paths given associated Wi-Fi scans in the traces, as shown at block 1016. As an example, a path of a user trace may be determined using the Viterbi algorithm (e.g., most likely path through a graph) based on one or more of motion probabilities from dead reckoning, transition probabilities from floor plan, or emission probabilities from a Wi-Fi model. The non-linear least squares optimizer 604 may receive the output of the global search and align with the dead reckoning to a Viterbi path, as shown at block 1018, and jointly optimize all paths and Wi-Fi maps using a SLAM optimization, as shown at block 1020.

The SLAM optimization is performed iteratively on growing subsets of states and constraints to determine a location of a user when data was collected based on all data collected. A first iteration uses subsets so that a function minimized is convex. Running SLAM on these subsets gives an estimate of the state subset. This estimate is used for determining the next subsets to include and the initialization to use for the next iteration. Thus, more constraints are added using a previous determination as a time starting point as the best prediction. The system 600 defines a process that selects states, optimizes the states using a non-linear least squares solver, and runs SLAM algorithms to determine how to initialize the state for the next optimization iteration.

Although examples are described as determining a Wi-Fi signal strength map, similar or same functions may be performed to determine localization of passively collected traces for creation of other types of maps, such as magnetometer maps.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
executing, on a computing device, for a first time period, a first location provider (LP) process and a second LP process;
obtaining at least one first estimated location of the computing device from the executing of the first LP process;
obtaining at least one second estimate location of the computing device from the executing of the second LP process;
obtaining sensor data from one or more sensors of the computing device, wherein the sensor data corresponds to the first time period;
determining, using at least the sensor data, a respective accuracy of each of the first LP process and the second LP process; and
based on at least the determined accuracies of the first LP process and the second LP process, selecting one of the first LP process and the second LP process to execute for a second time period.

2. The method of claim 1, further comprising disabling the other one of the first LP process and the second LP process for the second time period based on at least the determined accuracies of the first LP process and the second LP process.

3. The method of claim 1, wherein determining the respective accuracies of the first LP process and the second LP process comprises:
determining, using at least the sensor data, a motion model of the computing device that provides one or more expected locations of the computing device; and
comparing the at least one first estimated location and the at least one second estimate location with the one or more expected locations provided by the motion model.

4. The method of claim 3, wherein selecting one of the first LP process and the second LP process based on at least the determined accuracies of the first LP process and the second LP process comprises selecting the first LP process based on the respective accuracy of the first LP process being greater than the respective accuracy of the second LP process.

5. The method of claim 3, further comprising obtaining location data corresponding to a third time period prior to the first time period, wherein the motion model is further determined based on the location data.

6. The method of claim 3, further comprising obtaining activity data indicative of an estimated activity of a user carrying the computing device during the first time period, wherein the motion model is further determined based on the activity data.

7. The method of claim 1, further comprising:
receiving a request for location information from an application running on the computing device, wherein the application corresponds to a desired accuracy; and
selecting the one of the first LP process and the second LP process to execute for the second time period based on the determined respective accuracy of the one of the first LP process and the second LP process meeting the desired accuracy.

8. The method of claim 1, further comprising:
receiving an indication of a battery power level of the computing device falling below a threshold level,
wherein at least the selecting is carried out in response to receiving the indication of the battery power level falling below the threshold level.

9. The method of claim 1:
wherein executing the first LP process comprises detecting a presence of one or more known wireless access points, and
wherein executing the second LP process comprises processing global positioning system data.

10. The method of claim 1:
wherein executing the first LP process comprises processing global positioning system data, and
wherein the second LP process is executed without utilizing any global positioning system data.

11. The method of claim 1:
wherein executing the first LP process comprises executing a software process, and
wherein executing the second LP process comprises executing a hardware process.

12. A computing device comprising:
one or more processors;
one or more sensors; and
data storage including instructions executable by the one or more processors to perform operations comprising:
executing, for a first time period, a first location provider (LP) process and a second LP process,
obtaining at least one first estimated location of the computing device from the executing of the first LP process,
obtaining at least one second estimate location of the computing device from the executing of the second LP process,
obtaining sensor data from the one or more sensors of the computing device, wherein the sensor data corresponds to the first time period,
determining, using at least the sensor data, a respective accuracy of each of the first LP process and the second LP process, and
based on at least the determined accuracies of the first LP process and the second LP process, selecting one of the first LP process and the second LP process to execute for a second time period.

13. The computing device of claim 12, wherein the data storage further comprises instructions executable by the one or more processors to disable the other one of the first LP process and the second LP process for the second time period based on at least the determined accuracies of the first LP process and the second LP process.

14. The computing device of claim 12, wherein determining the respective accuracies of the first LP process and the second LP process comprises:
determining, using at least the sensor data, a motion model of the computing device that provides one or more expected locations of the computing device; and comparing the at least one first estimated location and the at least one second estimate location with the one or more expected locations provided by the motion model.

15. The computing device of claim 14, wherein selecting one of the first LP process and the second LP process based on at least the determined accuracies of the first LP process and the second LP process comprises selecting the first LP process based on the respective accuracy of the first LP process being greater than the respective accuracy of the second LP process.

16. The method of claim 1:
wherein executing the first LP process comprises processing global positioning system data, and
wherein the second LP process is executed without utilizing any global positioning system data.

17. A method comprising:
executing, on a computing device, a first location provider (LP) process to obtain at least one estimated location of the computing device for a first time period;
determining a motion model of the computing device that provides at least one expected location of the computing device for the first time period;
making a comparison of the at least one estimated location with the at least one expected location provided by the motion model; and
based on at least the comparison, enabling both the first LP process and a second LP process to execute on the computing device for a second time period to evaluate which of the first LP process and the second LP process is more accurate.

18. The method of claim 17, wherein evaluating which of the first LP process and the second LP process is more accurate comprises evaluating which of the first LP process and the second LP process indicates estimated locations that are closer to expected locations provided by the motion model.

19. The method of claim 17, further comprising after executing on the computing device both the first LP process and the second LP process for the second time period:
obtaining at least one first estimated location of the computing device for the second time period from the executing of the first LP process;
obtaining at least one second estimate location of the computing device for the second time period from the executing of the second LP process;
making a second comparison of the at least one first estimated location, the at least one second estimated location, and expected locations from the motion model for the second time period; and
disabling one of the first LP process and the second LP process for a third time period based on the second comparison.

20. The method of claim 17, wherein enabling both the first LP process and a second LP process to execute on the computing device for a second time period based on at least the comparison comprises:
determining that the at least one estimated location of the computing device for the first time period is outside of a threshold distance around the at least one expected location of the computing device for the first time period; and
responsive to the determination that the at least one estimated location of the computing device for the first time period is outside of the threshold distance, enabling both the first LP process and a second LP process to execute on the computing device for a second time period to evaluate which of the first LP process and the second LP process is more accurate.

* * * * *